(12) United States Patent
Boddakayala et al.

(10) Patent No.: US 8,695,740 B1
(45) Date of Patent: Apr. 15, 2014

(54) VEHICLE TRACTION BATTERY VENTILATION CONTROL

(71) Applicant: Ford Global Technologies, LLC, Dearborn, MI (US)

(72) Inventors: Bhaskara Boddakayala, Canton, MI (US); Rajaram Subramanian, Ann Arbor, MI (US); Brandon M. Dawson, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/689,946

(22) Filed: Nov. 30, 2012

(51) Int. Cl.
*H01M 2/12* (2006.01)

(52) U.S. Cl.
USPC ................ 180/65.29; 180/65.28; 429/61

(58) Field of Classification Search
USPC .................... 180/65.28–65.29, 68.1
See application file for complete search history.

(56) References Cited

U.S. PATENT DOCUMENTS

| | | | |
|---|---|---|---|
| 6,794,848 B2 * | 9/2004 | Shinada et al. | 320/104 |
| 7,988,543 B2 | 8/2011 | Major | |
| 2004/0104709 A1 * | 6/2004 | Yamaji et al. | 320/150 |
| 2009/0029262 A1 * | 1/2009 | Naruse | 429/254 |
| 2010/0273034 A1 * | 10/2010 | Hermann et al. | 429/62 |
| 2012/0070706 A1 * | 3/2012 | Miyazaki et al. | 429/61 |

FOREIGN PATENT DOCUMENTS

| | | |
|---|---|---|
| DE | 102009035464 A1 | 2/2011 |
| DE | 102009035474 A1 | 2/2011 |

* cited by examiner

*Primary Examiner* — Jeffrey J Restifo
*Assistant Examiner* — Erez Gurari
(74) *Attorney, Agent, or Firm* — David B. Kelley; Brooks Kushman P.C.

(57) ABSTRACT

A vehicle having a traction battery disposed within a battery housing is provided. The battery housing is in selective fluid communication with the cabin of the vehicle. An accessory battery separate and distinct from the traction battery is also provided. A closeable barrier system is electrically connected with the accessory battery and is configured to fluidly isolate the battery housing from the cabin when closed. At least one controller is configured to, in response to a trigger condition, disable the traction battery and increase an output of the accessory battery to close the barrier system to isolate gas in the battery housing from the cabin.

9 Claims, 3 Drawing Sheets

VEHICLE TRACTION BATTERY VENTILATION CONTROL

TECHNICAL FIELD

The present disclosure relates to the control of the ventilation of a traction battery in a vehicle.

BACKGROUND

A hybrid electric vehicle (HEV) is a vehicle that can be propelled by an engine and a traction battery. A plug-in hybrid electric vehicle (PHEV) is a HEV in which the traction battery can be charged by being plugged in to an external power source. A battery electric vehicle (BEV) is a vehicle that does not include an engine and is propelled only by a traction battery. HEV's, PHEV's and BEV's are three examples of vehicles that are at least partially propelled by a traction battery. In such applications, the vehicles typically include a ventilation system to expel heat, air and gas away from the traction battery to maximize efficient operability of the battery.

SUMMARY

According to one embodiment, a vehicle includes a battery housing in selective fluid communication with a cabin of the vehicle. A traction battery is disposed within the housing. An accessory battery separate and distinct from the traction battery is provided. A closeable barrier system is electrically connected with the accessory battery and is configured to fluidly isolate the battery housing from the cabin when closed. At least one controller is provided. In response to a trigger condition, the at least one controller disables the traction battery and increases output of the accessory battery to close the barrier system and isolate gas in the battery housing from the cabin.

According to another embodiment, a vehicle includes a traction battery and a traction battery housing surrounding the traction battery. The traction battery housing is in selective fluid communication with a cabin of the vehicle. A door system is electrically powered by an accessory battery and is operable to selectively isolate the battery housing from the cabin compartment. A duct or a conduit fluidly connects the traction battery housing to the cabin. The door system includes a door arranged such that the door is at least partially disposed outside of the conduit when the door system is open, and is at least partially disposed inside the conduit when the door system is closed.

According to yet another embodiment, a method for controlling a vehicle having a traction battery is provided. The method includes disabling the traction battery in response to a gas being detected. In response to the gas being detected, an output power of an accessory batter is increased such that a barrier system closes to fluidly isolate a traction battery housing from a cabin of the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
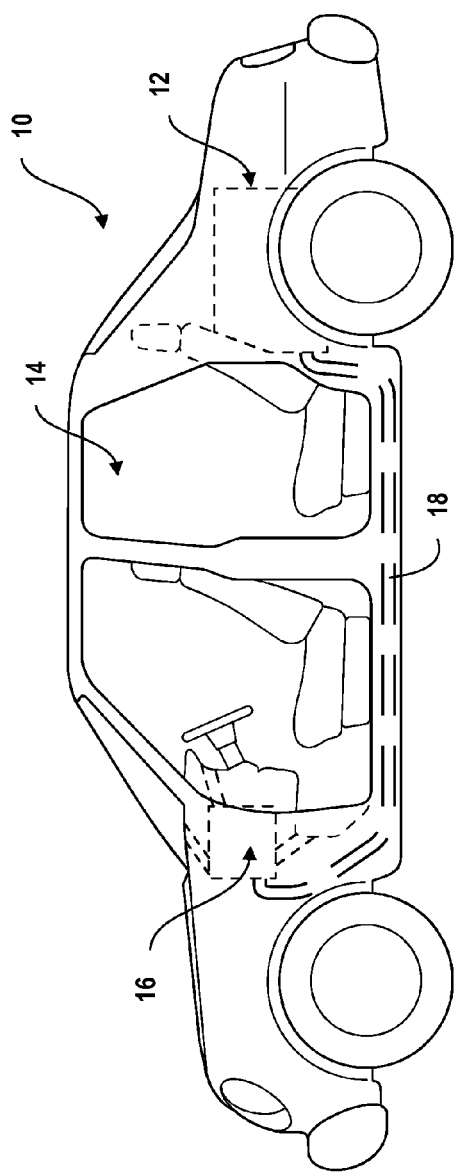
FIG. 1 is a side view of a vehicle and a ventilation system within the vehicle.

Referring to FIG. 1, a vehicle 10 is illustrated. The vehicle 10 is an HEV, PHEV, BEV or any vehicle in which a traction battery 12 works to at least partially propel the vehicle 10. Although the battery 12 is shown rearward of a passenger cabin compartment 14 of the vehicle 10 and directly rearward of a rear seat, the battery 12 can be located in other locations, such as under the hood in the front of the vehicle 10.

A heating, ventilation, and air conditioning (HVAC) unit 16 circulates air into and throughout the cabin 14 of the vehicle 10. Conduits or ducts 18 provide a fluid communication line that interconnects the HVAC unit 16 with the housing of the battery 12 and the vehicle cabin 14. Air circulating throughout the cabin 14 can thus be circulated into and out of the housing of the battery 12.

Figure 2:
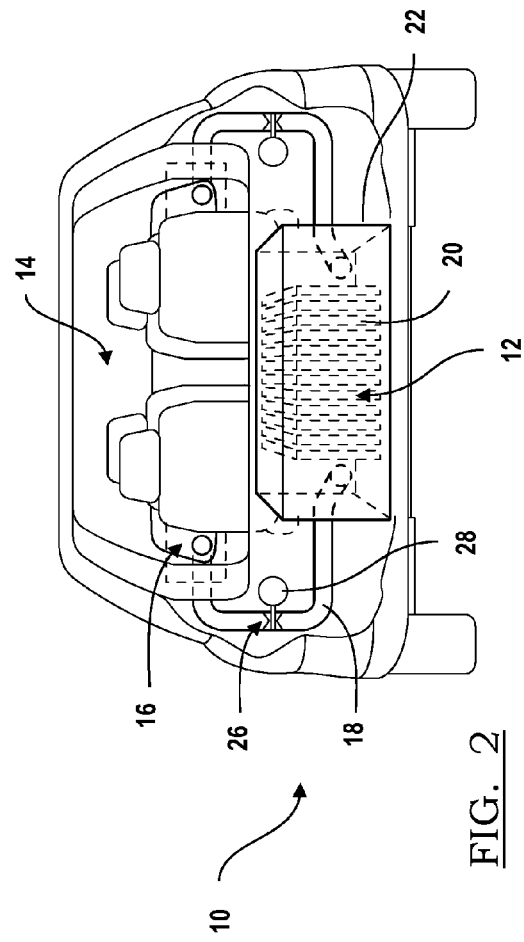
FIG. 2 is a rear view of a battery ventilation system within the vehicle.

Referring to FIG. 2, a battery ventilation system is illustrated. The battery 12 is again shown in the rearward portion of the vehicle 10 behind the vehicle cabin 14. The battery 12 includes a plurality of battery cells 20. The battery cells 20 store electric energy that can be used to propel the vehicle, as will be described with reference to FIG. 3.

A battery housing 22 surrounds the battery 12 to compartmentalize the battery 12 and to separate the battery 12 from the cabin 14. The ducts 18 are connected to the battery housing 22 and to the HVAC 16 such that air and heat produced by the battery 12 inside the battery housing 22 can be exchanged with the air inside the cabin 14. The ducts 18 can also connect the housing 22 with the outside atmosphere.

Under normal operating conditions, the battery 12 releases heat into the housing 22 as a product of electrical resistance in the battery 12. The heat produced by the battery 12 can be used to increase the temperature of the cabin 14 via the HVAC unit 16 and ducts. Likewise, air from the cabin 14 can be directed into the battery housing 22 to reduce the temperature of the battery 12 and prevent overheating, for example. Under normal operating conditions, the battery 12 and housing 22 can therefore be integrated into the heating and cooling system within the vehicle 10.

As is the case with all electrical devices, faults within the battery 12 could possibly lead to a situation in which the battery is not operating under normal conditions. These situations can include an internal or external short in a battery cell 20, or a failure in the overcharging protection circuits, for example. These situations can be sensed and flagged as a trigger condition, as will be described. As a precautionary measure, any possibility of undesirable gases such as carbon monoxide (CO) entering the vehicle cabin 14 must therefore be eliminated in response to the detection of any trigger condition.

A closable barrier 26 is therefore provided in the duct 18. The barrier 26 can be a door, an inflatable bag, expandable foam, or any other type of boundary that can selectively isolate gases in the battery housing 22 from the vehicle cabin 14. While illustrated as being disposed in the ducts 18, the barrier 26 can additionally or alternatively be located within the battery housing 22 or at the point in which the ducts 18 connect with the vehicle cabin 14.

A motor 28 operates to close the barrier 26 in response to the trigger condition, as will be described with reference to FIGS. 3-4. When the motor is activated to close the barrier, the barrier 26 transitions from an open position in which the battery housing 22 is in fluid communication with the vehicle cabin 14, to a closed position in which the door 26 fluidly isolates the battery housing 22 from the vehicle cabin 14.

Figure 3:
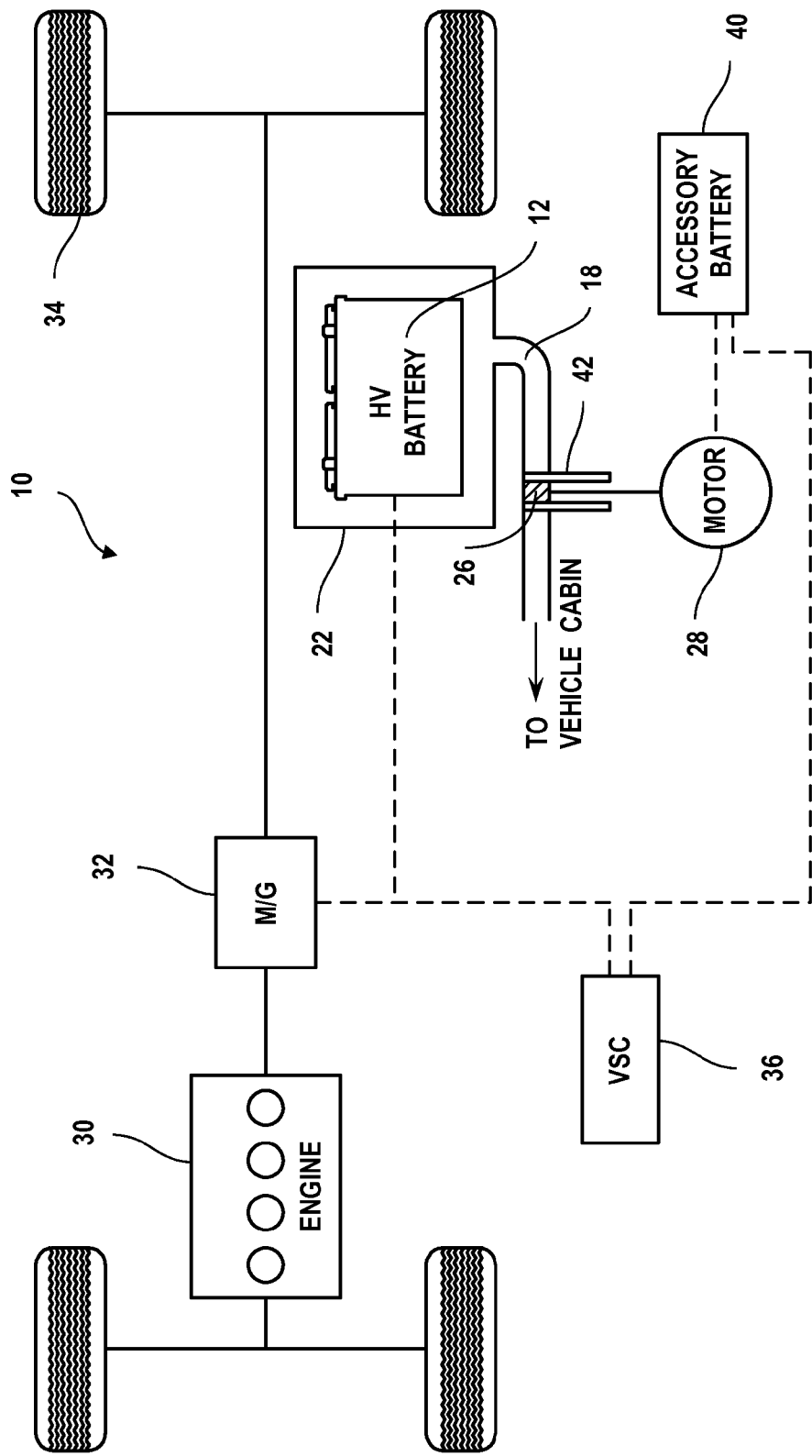
FIG. 3 is a schematic of a portion of a powertrain and a battery ventilation system.
Figure 4:
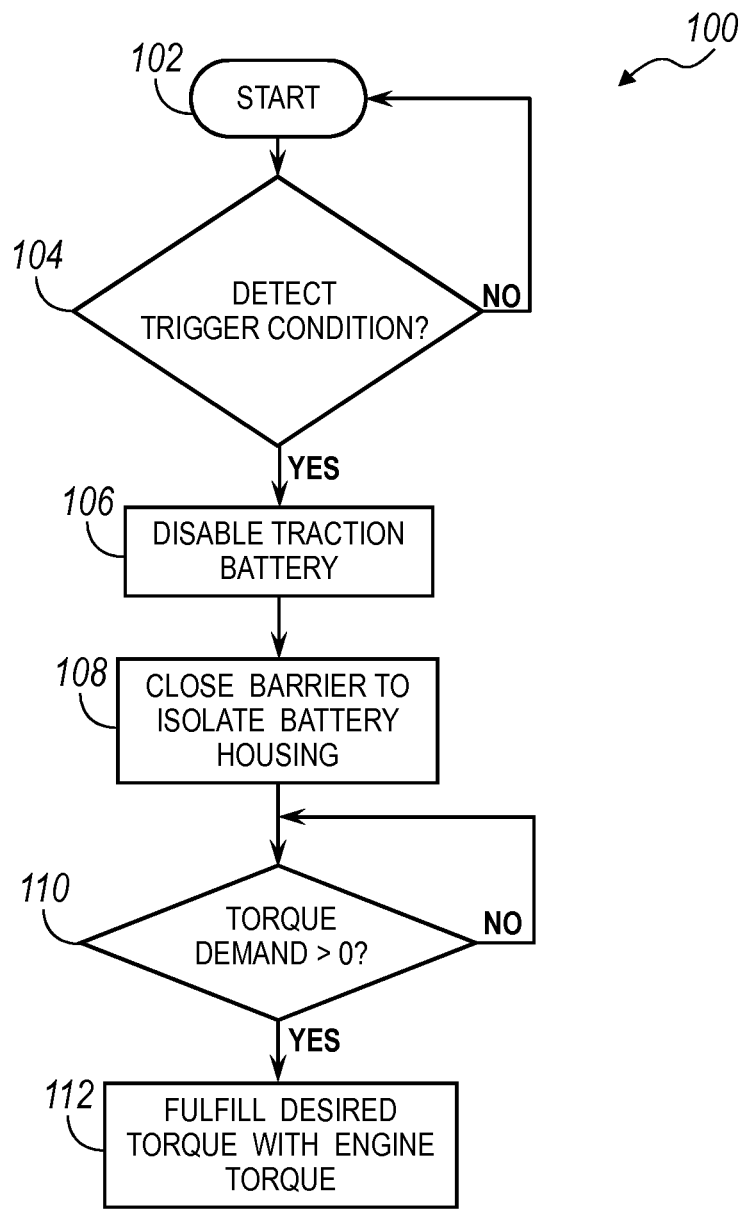
FIG. 4 is a flowchart illustrating an algorithm implemented by a control system in the vehicle.

Referring to FIG. 3, a schematic of the vehicle 10 is shown. As previously described, the vehicle 10 can be any vehicle capable of being at least partially propelled by a high voltage (HV) battery or traction battery 12. The particular vehicle 10 illustrated in FIG. 3 is an HEV or PHEV that includes an internal combustion engine 30. The engine 30 is coupled to a motor-generator (M/G) 32. The M/G 32 is electrically connected to the battery 12.

The M/G 32 can operate as a generator by receiving torque from the engine 30 and supplying AC voltage to an inverter (not shown), in which the AC voltage is converted into DC voltage to charge the battery 12. The M/G 32 can also operate as a generator by utilizing conventional regenerative braking methods to convert the braking energy of the vehicle 10 into electric energy to be stored in the battery 12. Alternatively, the M/G 32 can operate as a motor by receiving current or power from the inverter (not shown) and battery 12, and providing torque through the driveline and ultimately to the wheels 34.

The operation of the battery 12 and the M/G 32 are controlled by a vehicle system controller (VSC) 36. Although the control system illustrated in FIG. 3 includes only one controller 36, such a control system can include more than one controller as desired. For example, a battery control module (BCM) can be provided to specifically control the battery 12. Similarly, a separate motor control module (MCM) can be provided to directly control the M/G 32, and an engine control module (ECM) can be provided to directly control the engine 30. These and other controllers can all be connected in a control area network (CAN). It should therefore be understood that references in the present disclosure to certain capabilities or functions performed by the controller or VSC 36 can be performed by any other controller or multiple controllers.

The VSC 36 is also connected to an accessory battery 40. The accessory battery 40 is separate and distinct from the traction battery 12. The accessory battery stores electrical energy to operate the motor 28 to open and close the barrier 26. The accessory battery 40 can receive and store electrical energy from the fraction battery 12, from the M/G 32, the engine 30, or any other device capable of producing and/or transmitting electrical energy. The accessory battery 40 is mounted to the vehicle 10 or vehicle body outside of the battery housing 22. An inverter (not shown) can also be provided between the accessory battery 40 and the motor 28.

As previously described, the barrier 26 can take the form of a door, a bag, a gate, or any other structure that isolates the battery housing 22 from the vehicle cabin 14. For example, the barrier 26 can be a sliding door that can slide along guide rails or tracks 42. The tracks 42 can be disposed through at least a portion of the duct 18 and extend at least partially outside of the duct 18. This enables the barrier 26 to be outside of the duct 18 during normal operation and inside the duct in response to the trigger condition.

Control and operation of a gas isolation system can be utilized as follows. Gas sensors or other sensors can be placed throughout the battery housing 22 or within the battery 12 which sense a trigger condition (as previously described). In response to the trigger condition, the VSC 36 commands the traction battery 12 to disable. This immediately inhibits any additional production of unwanted gas, for example, within the battery housing 22. The VSC 36 then commands the engine 30 to activate or increase in torque such that any torque losses due to the deactivation of the battery 12 are supplemented and driver power demands remain fulfilled. Generally simultaneous with the disabling of the battery 12 and in response to the sensed trigger condition, the VSC 36 commands the accessory battery 40 to power the motor 28 to close the barrier 26.

Using the accessory battery 40 rather than the traction battery 12 to operate the motor 28 prevents any additional unwanted gases from being produced by the traction battery 12. Furthermore, if a fault has occurred in the traction battery 12, utilization of the traction battery 12 to operate the motor 28 can potentially cause further damage to the traction battery 12.

Once the barrier 26 has been closed by the accessory battery 40, the traction battery 12 and battery housing 22 are isolated from the cabin 14. Any and all gases formed as a result of a fault in the battery 12 are thus contained within the battery housing 22 and inhibited from entering the interior of the vehicle 10. In one embodiment, a visual and/or audio alert is transmitted to the occupants of the vehicle 10 indicating that the battery has been disabled and service is required. This alert can be provided on a dashboard of the vehicle 10, for example. The vehicle 10 can be driven in engine-only mode until the battery 12 is properly repaired.

While not shown in FIG. 3, it is contemplated that the vehicle 10 may be a BEV and may not have an internal combustion engine 30. Disabling of the battery 12 in response to the trigger condition would disable the only source of propulsion. It may therefore not be desirable to disable the entire battery 12 based on the trigger condition. Controls can be provided to selectively disable the portion of the battery 12 in which the fault occurs such that the remainder of the battery 12 can remain enabled to allow the operator of the vehicle 10 to travel a safe distance until the battery 12 can be repaired.

Referring to 2 and 4, a method for controlling ventilation of a traction battery within a vehicle is shown at 100. The method is controlled and implemented by the VSC 36 or other controllers. The method starts at operation 102. At operation 104, the VSC 36 determines whether or not a trigger condition is sensed, such as the detection of a gas within the battery housing 22. If no trigger condition is detected, the method restarts at 102 such that a continuous check of trigger conditions is present. In response to a trigger condition being detected at operation 104, the VSC 36 commands a disabling of the traction battery 12 at operation 106. At operation 108, the VSC 36 also commands the accessory battery 40 to provide power to close the barrier 26. Operation 108 can be implemented in response to the detection of the trigger condition, or in response to the traction battery 12 being disabled.

At operation 110, the VSC 36 determines whether the demanded torque at the wheels from the operator of the vehicle 10 is greater than 0 N-m. A positive torque demand can be sensed in response to a depression of the accelerator pedal, for example. A positive torque demand can also be sensed in response to a need for the vehicle 10 to creep or maintain its position on an incline when the brake pedal is released, for example. Other situations are contemplated that result in a positive torque demand. In any such situation, if the torque demand is 0 N-m or below, the method recycles at operation 110 to continuously check for any positive torque demand. If a positive torque demand is indicated, the engine 30 fulfills all torque demands without any electrical assist from the traction battery 12 at operation 112. This engine 30 thus fulfills all driver demand, and the vehicle 10 no longer operates in an electric-only or electric-assist mode.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a battery housing in selective fluid communication with a cabin of the vehicle;
   a traction battery disposed within the housing;
   an accessory battery;
   an engine;
   a closeable barrier system electrically connected with the accessory battery and configured to fluidly isolate the battery housing from the cabin when closed; and
   at least one controller configured to, in response to a trigger condition, disable the traction battery and increase an output of the accessory battery to close the barrier system to isolate gas in the battery housing from the cabin, wherein the at least one controller is further configured to, in response to the trigger condition, increase torque output of the engine to satisfy driver torque demands.

2. The vehicle of claim 1, wherein the at least one controller is further configured to, in response to the trigger condition, activate the engine to satisfy driver torque demands.

3. The vehicle of claim 1 further comprising a duct fluidly connecting the battery housing and cabin, wherein the barrier system includes a door arranged such that the door is at least partially disposed outside of the duct when the barrier system is open.

4. The vehicle of claim 1 further comprising a sensor disposed within the traction battery housing and configured to detect a composition of gas therein, wherein the trigger condition is based on the composition of the gas.

5. A vehicle comprising:
   a traction battery;
   a traction battery housing surrounding the traction battery and in selective fluid communication with a cabin of the vehicle;
   a door system electrically powered by an accessory battery and operable to selectively isolate the battery housing from a cabin compartment of the vehicle; and
   a conduit fluidly connecting the traction battery housing to the cabin, wherein the door system includes a door arranged such that the door is at least partially disposed outside of the conduit when the door system is open.

6. The vehicle of claim 5 further comprising at least one controller configured to, in response to a trigger condition, disable the traction battery and close the door system to isolate the battery housing from the cabin.

7. The vehicle of claim 5 further comprising a sensor disposed within the traction battery housing and configured to detect a composition of gas therein, wherein a trigger condition is based on the composition of the gas, and wherein the door system is operable to close in response to the trigger condition.

8. A method for controlling a vehicle comprising:
   in response to a fault condition, (i) disabling a traction battery, (ii) closing a barrier system electrically powered by an accessory battery such that a housing surrounding the traction battery is fluidly isolated from a cabin of the vehicle, and (iii) activating an engine to satisfy driver torque demands.

9. The method of claim 8 further comprising, in response to disabling the traction battery, increasing a torque output by an engine proportional to a decrease in power output by the traction battery associated with disabling the traction battery to satisfy driver torque demands.

* * * * *